US011297189B2

(12) United States Patent
Okhrimenko

(10) Patent No.: US 11,297,189 B2
(45) Date of Patent: *Apr. 5, 2022

(54) METHOD AND SYSTEM FOR TRANSMISSION OF A SESSION INITIATION PROTOCOL (SIP) IDENTITY HEADER IN AN OUT-OF-BAND VERIFICATION NETWORK

(71) Applicant: AB Handshake Corporation, Miami, FL (US)

(72) Inventor: Sergei Okhrimenko, St. Petersburg (RU)

(73) Assignee: AB Handshake Corporation, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/077,718

(22) Filed: Oct. 22, 2020

(65) Prior Publication Data

US 2022/0070300 A1 Mar. 3, 2022

Related U.S. Application Data

(63) Continuation-in-part of application No. 17/068,963, filed on Oct. 13, 2020, which is a continuation of
(Continued)

(51) Int. Cl.
*H04M 15/00* (2006.01)
*H04Q 3/00* (2006.01)
*H04M 3/42* (2006.01)

(52) U.S. Cl.
CPC ....... *H04M 15/47* (2013.01); *H04M 3/42297* (2013.01); *H04M 15/41* (2013.01); *H04Q 3/005* (2013.01); *H04M 2215/0148* (2013.01)

(58) Field of Classification Search
CPC combination set(s) only.
See application file for complete search history.

(56) References Cited

U.S. PATENT DOCUMENTS 8,729,586 B2 5/2014 Wu et al.
9,471,932 B2 10/2016 Kawecki, III
(Continued)

FOREIGN PATENT DOCUMENTS

| CN | 108810900 A | 11/2018 |
|---|---|---|
| KR | 100967604 B1 | 7/2010 |
| WO | 2018/144745 A1 | 8/2018 |

OTHER PUBLICATIONS

Transnexus website "Stir/Shaken overview", URL: https://transnexus.com/whitepapers/stir-and-shaken-overview/, Dec. 2018.
(Continued)

*Primary Examiner* — Phung-Hoang J Nguyen
(74) *Attorney, Agent, or Firm* — Sunstein LLP

(57) ABSTRACT

A computer-implemented network verification system includes a second device situated in a terminating call network and configured to receive a call signal from a first device situated in an originating network. The first device is coupled to a first registry that stores originating call records. The first registry is configured to obtain, from the first device, and store call data and a SIP identity header associated with the call signal. The system also includes a second registry coupled to the second device and configured to receive, from the first registry over an out-of-band verification network, a first verification request that contains the originating call record, including the SIP identity header associated with the call signal. The second registry is further configured to send the SIP identity header contained in the first verification request to the second device.

21 Claims, 12 Drawing Sheets

Related U.S. Application Data application No. 17/011,336, filed on Sep. 3, 2020, now Pat. No. 10,951,775.

(56) References Cited

U.S. PATENT DOCUMENTS

| | | | |
|---|---|---|---|
| 9,762,731 B1 | 9/2017 | Cohen | |
| 10,182,034 B1 | 1/2019 | Koster | |
| 10,482,531 B2 | 11/2019 | Drotos et al. | |
| 10,762,723 B1 | 9/2020 | Zhou | |
| 10,805,462 B1 | 10/2020 | Ginter et al. | |
| 2004/0202296 A1* | 10/2004 | Dokko | H04M 15/41 379/114.01 |
| 2007/0064893 A1* | 3/2007 | Halpern | H04Q 3/66 379/142.01 |
| 2011/0016363 A1 | 1/2011 | Washio | |
| 2012/0140903 A1* | 6/2012 | Zhang | H04L 41/5087 379/32.01 |
| 2012/0243530 A1 | 9/2012 | Rosenberg et al. | |
| 2013/0260743 A1 | 10/2013 | Wang et al. | |
| 2013/0315386 A1* | 11/2013 | Stachiw | H04M 15/47 379/114.14 |
| 2013/0322263 A1* | 12/2013 | Lang | H04M 15/41 370/244 |
| 2018/0294959 A1 | 10/2018 | Traynor et al. | |
| 2018/0295140 A1 | 10/2018 | Lu et al. | |
| 2019/0007553 A1* | 1/2019 | Noldus | H04M 3/2281 |
| 2019/0037081 A1 | 1/2019 | Rao et al. | |
| 2020/0112636 A1 | 4/2020 | Thomas et al. | |
| 2020/0153877 A1 | 5/2020 | Scivicque | |

OTHER PUBLICATIONS

Okhrimenko—"Presented to the Seismic Group GSMA (Global System for Mobile Communications) meeting on Oct. 8, 2019."
Okhrimenko—"Presented to RAG (Risk and Assurance Group) conference on May 13, 2020."

* cited by examiner

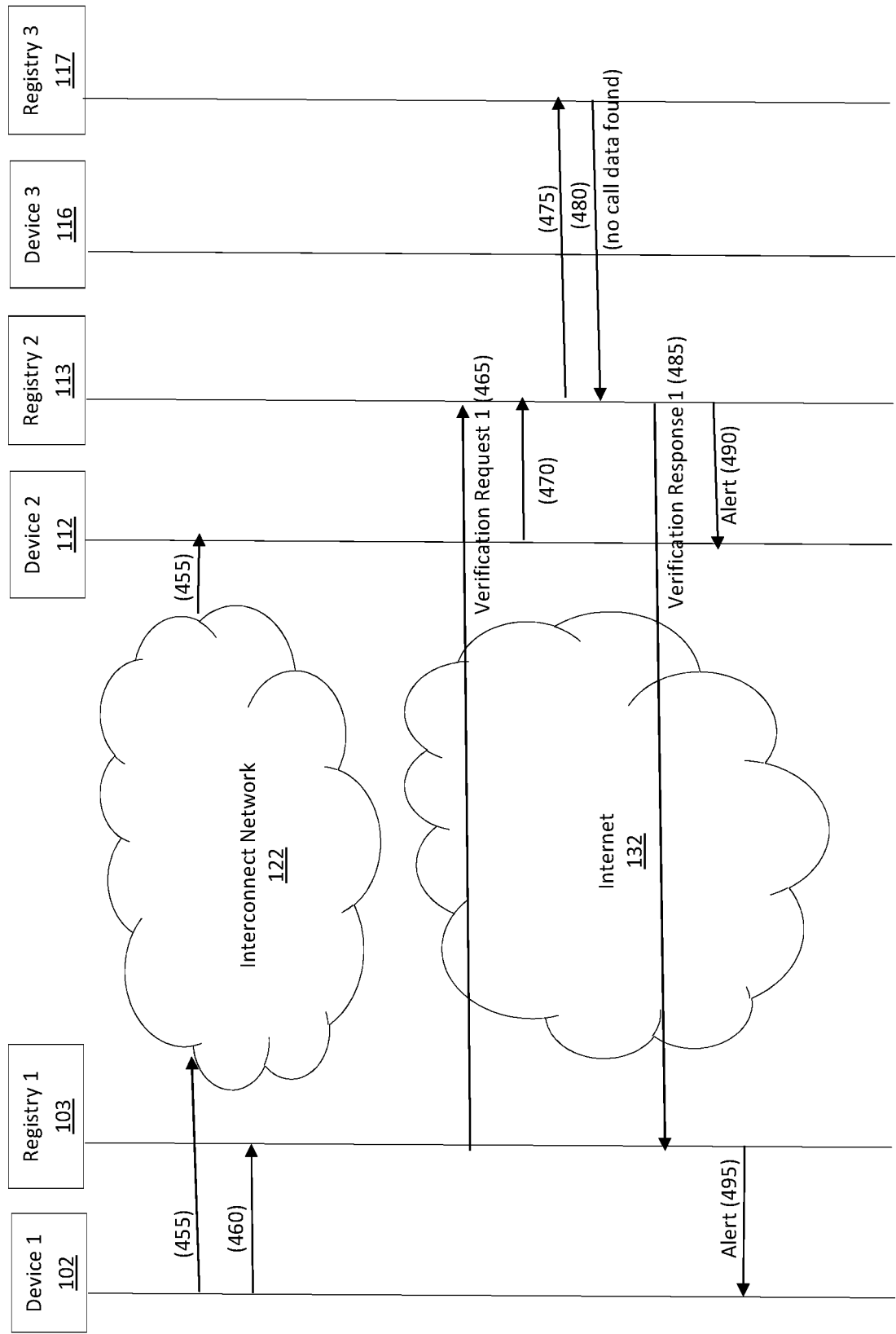

METHOD AND SYSTEM FOR TRANSMISSION OF A SESSION INITIATION PROTOCOL (SIP) IDENTITY HEADER IN AN OUT-OF-BAND VERIFICATION NETWORK

PRIORITY

This application is a continuation-in-part of U.S. patent application Ser. No. 17/068,963, filed on Oct. 13, 2020, which is a continuation of U.S. patent application Ser. No. 17/011,336, filed on Sep. 3, 2020. Each of these applications is incorporated herein in its entirety by reference.

TECHNICAL FIELD

The present invention relates to fraud detection for voice calls, and more particularly to the detection of the manipulation of the call signals used to execute the calls.

BACKGROUND ART

In the telecommunication environment, voice call communications within interconnected carrier networks are often manipulated for fraudulent purposes, such as to facilitate robocalls or other scams (e.g., Wangiri scam). For example, the call signals for communicating a call may be manipulated to cause caller identifier (CLI) spoofing, short stopping, call stretching, interconnect bypass, private branch exchange (PBX) hack, etc. Present solutions for detecting such call fraud, such as present implementations of Secure Telephone Identity Revisited/Secure Handling of Asserted Information Using Tokens (STIR/SHAKEN), require complex procedures or have other deficiencies that prevent detecting, alerting, and blocking of such fraudulent activities in real-time.

SUMMARY OF THE EMBODIMENTS

In accordance with embodiments of the invention, a computer-implemented network verification system includes a first device situated in an originating call network. The first device configured to send call signals to a second device situated in a terminating call network, wherein the second device is coupled to a second registry that stores call signals' data received at the second device as terminating call records. The system also includes a first registry coupled to the first device and configured to, in real-time, obtain, from the first device, call data sent in a call signal and a SIP identity header associated with the call signal, and store as an originating call record in the first registry. The first registry also configured to, in real-time, send, to the second registry over the out-of-band verification network, a first verification request containing the originating call record, and receive a first verification response, wherein the second registry is configured to send the SIP identity header contained in the first verification request to the second device. The first registry further configured to, in real-time, receive, from the second registry over the out-of-band verification network, a second verification request containing a terminating call record that includes a SIP identity header associated with the call signal, and send a second verification response.

In some embodiments, call data contained in a call signal includes a calling A-number, a called B-number, and a call event mark. In some embodiments, the first registry is further configured to obtain, from the first device, number portability information and roaming information associated with the obtained call data. In some embodiments, the first verification request and second verification request include a calling A-number, a called B-number, a call event mark, number portability information, and roaming information associated with a call signal. In some embodiments, the first verification response and second verification response include a calling A-number, a called B-number, a call event mark, number portability information, and roaming information associated with a call signal. In some embodiments, the obtained call data is transmitted from the first device to the first registry by a standard networking protocol, including RADIUS, Diameter, HTTP, or SIGTRAN. In some embodiments, the first registry is further configured to match a called-B number in the originating call record to corresponding E164 ranges so as to identify a host address of the second registry to send the first verification request.

In accordance with embodiments of the invention, a computer-implemented network verification system includes a second device situated in a terminating call network. The second device configured to receive a call signal from a first device situated in an originating network, wherein the first device is coupled to a first registry that stores call signals' data sent from the first device as originating call records. The system also includes a second registry coupled to the second device and configured to, in real-time, obtain, from the second device, call data received in a call signal and a SIP identity header associated with the call signal, and store as a terminating call record in the second registry. The second registry also configured to, in real-time, send, to the first registry over the out-of-band verification network, a second verification request containing the terminating call record, and receive a second verification response. The second registry further configured to, in real-time, receive, from the first registry over the out-of-band verification network, a first verification request that contains an originating call record that includes a SIP identity header associated with the call signal, and send a first verification response. The second registry also configured to, in real-time, send the SIP identity header contained in the first verification request to the second device.

In some embodiments, call data contained in a call signal includes a calling A-number, a called B-number, and a call event mark. In some embodiments, the second registry is further configured to obtain, from the second device, number portability information and roaming information associated with the obtained call data. In some embodiments, the first verification request and second verification request include a calling A-number, a called B-number, a call event mark, number portability information, and roaming information associated with a call signal. In some embodiments, the first verification response and second verification response include a calling A-number, a called B-number, a call event mark, number portability information, and roaming information associated with a call signal. In some embodiments, the obtained call data is transmitted from the second device to the second registry by a standard networking protocol, including RADIUS, Diameter, or HTTP. In some embodiments, the second registry is further configured to match a calling A-number in the terminating call record to corresponding E164 ranges to identify a host address of the first registry to send the second verification request.

In accordance with embodiments of the invention, a computer-implemented method of network verification includes obtaining, from a device situated in a terminating call network, call data received in a call signal and a SIP identity header associated with the call signal, and storing in a registry coupled to the device as a terminating call record.

The method further includes sending, to a remote registry over the out-of-band verification network, a second verification request containing the terminating call record, and receiving a second verification response. The method also includes receiving, from the remote registry over the out-of-band verification network, a first verification request that contains an originating call record that includes a SIP identity header associated with the call signal, and sending a first verification response. The method further includes sending the SIP identity header contained in the first verification request to the device.

In some embodiments, call data contained in a call signal includes a calling A-number, a called B-number, and a call event mark. In some embodiments, the method further includes obtaining, from the first device, number portability information and roaming information associated with the obtained call data. In some embodiments, the first verification request and second verification request include a calling A-number, a called B-number, a call event mark, number portability information, and roaming information associated with a call signal. In some embodiments, the first verification response and second verification response include a calling A-number, a called B-number, a call event mark, number portability information, and roaming information associated with a call signal. In some embodiments, the obtained call data and SIP identity header is obtained from the device by a standard networking protocol, including RADIUS, Diameter, HTTP, or SIGTRAN. In some embodiments, the registry is further configured to match a called-B number in the terminating call record to corresponding E164 ranges so as to identify a host address of the remote registry to send the second verification request.

In accordance with embodiments of the invention, a computer system detects abnormalities in a call signal. The computer system includes a first device situated in an originating call network. The first device configured to send call signals to a second device situated in a terminating call network. The second device is coupled to a second registry that stores call signals' data received at the second device as terminating call records. The computer system also includes a first registry coupled to the first device. The first registry is configured to, in real-time, obtain, from the first device, call data sent in a call signal, and store the obtained call data as an originating call record in the first registry. The first registry is also configured to, in real-time, send, to the second registry, a first verification request containing the originating call record, and receive a first verification response, and in response: detect, by processing response data included in the first verification response, a discrepancy between the originating call record and terminating data in the second registry. The first registry is further configured to, in real-time, receive, from the second registry, a second verification request that includes, as request data, a terminating call record stored in the second registry, and in response: detect, by processing the request data: (i) whether an originating call record exists in the first registry that corresponds to the request data, and (ii) a discrepancy between such existing originating call record and the request data, and send, to the second registry, a second verification response based on the processing of the request data.

In some embodiments, call data contained in a call signal includes a calling A-number, a called B-number, and a call event mark. In some embodiments, the call event mark is a call start event. In some of these embodiments, the first registry is further configured to send a spoofing alert to the first device responsive to a discrepancy between a calling A-number in the first verification response and a calling A-number in a corresponding originating call record in the first registry. In some of these embodiments, the first registry is further configured to send a short stopping alert to the first device responsive to the first verification response indicating no call data corresponding to the originating call record exists in the second registry. In some embodiments, the call event mark is a call end event. In some of these embodiments, the first registry is further configured to send a call stretching alert to the first device responsive to a discrepancy between a call end event in the second verification request and a call end event in a corresponding originating call record in the first registry.

In some embodiments, the call event mark is a connect call event. In some of these embodiments, the first registry is further configured to send a false answer supervision alert to the first device responsive to the first verification response indicating no call data corresponding to the originating call record exists in the second registry. In some embodiments, the first registry is further configured to send a PBX hack alert to the first device responsive to PBX hack mark included in the first verification response.

In some embodiments, the first registry is further configured to obtain, from the first device, a Session Initiation Protocol (SIP) identity header, number portability information and roaming information associated with the obtained call data. In some embodiments, the first verification request and second verification request include a calling A-number, a called B-number, a call event mark, a SIP identity header, number portability information, and roaming information associated with a call signal. In some embodiments, the first verification response and second verification response include a calling A-number, a called B-number, a call event mark, number portability information, and roaming information associated with a call signal.

In some embodiments, the obtained call data is transmitted from the first device to the first registry by a standard networking protocol, including RADIUS, Diameter, HTTP, or SIGTRAN. In some embodiments, the first registry is further configured to match a called-B number in the originating call record to corresponding E164 ranges so as to identify a host address of the second registry to send the first verification request. In some embodiments, each of the call signals is a call start signal, a call connect signal, or a call end signal. In some embodiments, the first registry is further configured to include an indication in the second verification response responsive to no originating call record existing in the first registry that corresponds to the request data. In some embodiments, the first verification request, second verification request, first verification response, and second verification response are sent over an out-of-band channel configured between the first registry and second registry.

In accordance with related embodiments of the invention, a computer system detects abnormalities in a call signal. The computer system includes a second device situated in a terminating call network. The second device configured to receive a call signal from a first device situated in an originating network. The first device is coupled to a first registry that stores call signals' data sent from the first device as originating call records. The system also includes a second registry coupled to the second device. The second registry is configured to, in real-time obtain, from the second device, call data received in a call signal, and store the obtained call data as a terminating call record in the second registry. The second registry is also configured to, in real time, send, to the first registry, a second verification request containing the terminating call record, and receive a second verification response, and in response: detect, by processing response data included in the second verification response, a discrepancy between the terminating call record and originating data in the first registry. The second registry is further configured to, in real time, receive, from the first registry, a first verification request that includes, as request data, an originating call record stored in the first registry, and in response: detect, by processing the request data: (i) whether a terminating call record exists in the second registry that corresponds to the request data, and (ii) a discrepancy between such existing terminating call record and the request data, and send a first verification response based on the processing of the request data.

In some embodiments, call data contained in a call signal includes a calling A-number, a called B-number, and a call event mark. In some embodiments, the second registry is further configured to send a spoofing alert to the second device responsive to detection of a discrepancy between a calling A-number in the first verification request and a calling A-number in a corresponding terminating call record in the second registry. In some embodiments, the second registry is further configured to send an interconnect bypass alert to the second device responsive to the calling A-number in the corresponding terminating call record being a local A-number. In some embodiments, the second registry is further configured to send an unconfirmed call alert to the second device responsive to the second verification response indicating no data corresponding to the terminating call record in the first registry.

In some embodiments, the second registry is further configured to obtain, from the second device, a SIP identity header, number portability information and roaming information associated with the obtained call data. In some embodiments, the first verification request and second verification request include a calling A-number, a called B-number, a call event mark, a SIP identity header, number portability information, and roaming information associated with a call signal. In some embodiments, the first verification response and second verification response include a calling A-number, a called B-number, a call event mark, number portability information, and roaming information associated with a call signal. In some embodiments, the second registry is further configured to include an indication in the first verification response responsive to no terminating call record existing in the second registry that corresponds to the request data.

In some embodiments, the second registry is further configured to include a PBX hack mark in the first verification response responsive to: (a) the request data in the first verification request matching a terminating call record in the second registry, (b) a third-party verification request from a third-party matching a called B-number in the terminating call record, and (c) a discrepancy between a calling A-number in the third-party verification request and a calling A-number in the terminating call record. In some embodiments, the second registry is further configured to detect the discrepancy between the calling A-number in the first verification request and the calling A-number in a corresponding terminating call record in the second registry based on a verification response from a third registry coupled to a third device assigned the calling A-number in the terminating call record.

In some embodiments, the obtained call data is transmitted from the second device to the second registry by a standard networking protocol, including RADIUS, Diameter, or HTTP. In some embodiments, the second registry is further configured to match a calling A-number in the terminating call record to corresponding E164 ranges to identify a host address of the first registry to send the second verification request. In some embodiments, each of the call signals is a call start signal, a call connect signal, or a call end signal. In some embodiments, the second registry is further configured to send a SIP identity header received in the first verification request to the second device. In some embodiments, the first verification request, second verification request, first verification response, and second verification response are sent over an out-of-band channel configured between the first registry and second registry.

BRIEF DESCRIPTION OF THE DRAWINGS

The foregoing features of embodiments will be more readily understood by reference to the following detailed description, taken with reference to the accompanying drawings, in which:

FIG. 4B is a sequence diagram depicting logic flow for generating alerts based on the detection of discrepancies between originating call data, terminating call data, and third-party data associated with a call signal, in accordance with embodiments of the present invention.

DETAILED DESCRIPTION OF SPECIFIC EMBODIMENTS

Embodiments of the present invention are directed to methods and systems for detecting fraudulent activities with respect to voice calls, such as (CLI) spoofing, short stopping, call stretching, interconnect bypass, private branch exchange (PBX) hack, robocalls, Wangiri scams, etc., and alerting call network equipment to such activities in real-time. Some of the embodiments provide a bi-directional handshake exchange performed, over an encrypted out-of-band channel, between the call network that originates a call and the call network that terminates the call. The bi-directional handshake verifies the legitimacy of call signals that are communicated to execute the call.

Figure 1:
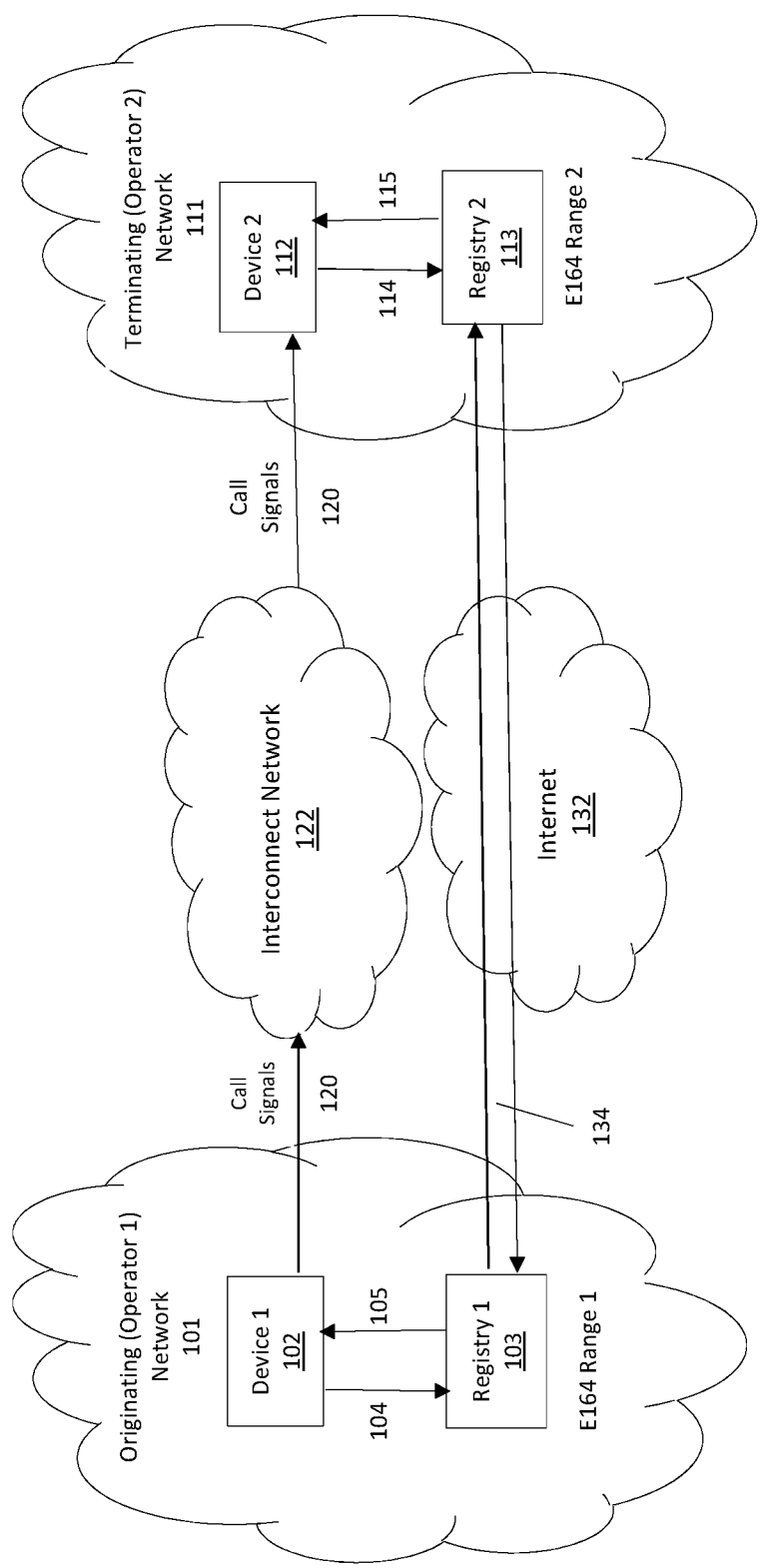
FIG. 1 is a block diagram of a computer system for detecting and blocking call fraud, in accordance with embodiments of the present invention.

FIG. 1 is a block diagram of a computer system for detecting and blocking call fraud, in accordance with embodiments of the present invention. The computer system includes an originating call network 101 associated with a first operator that originates a voice call. The originating call network 101 is in the E164 range 1. A first device (call switching device) 102 is situated in the originating call network 101 and communicatively coupled to a first call registry 103. The first device 102 may be a call session control function (CSCF) device, a session border controller (SBC) device, switch, a Customized Application for Mobile Enhanced Logic Service (CAMEL) gateway device, a Service Control Point (SCP) device, telephone application server (TAS), etc. The first registry 103 may be configured with the components shown in FIG. 2. The first registry 103 is assigned a host address (e.g., IP address) associated with the E164 to identify the first registry 103. The first device 102 is associated with a calling A-number.

The computer system of FIG. 1 also includes a terminating call network 111 associated with a second operator that terminates the call. The terminating call network 111 is in the E164 range 2. A second device (call switching device) 112 is situated in the terminating call network 111 and communicatively coupled to a second call registry 113. The second device 112 may be a call session control function (CSCF) device, a session border controller (SBC) device, switch, a Customized Application for Mobile Enhanced Logic Service (CAMEL) gateway device, a Service Control Point (SCP) device, a telephone application server (TAS), etc. The second registry 113 may be configured with the components shown in FIG. 2. The second registry 113 is assigned a host address (e.g., IP address) associate with the E164 to identify the second registry 113. The second device 112 is associated with a called B-number.

The computer system of FIG. 1 further includes an interconnect networks 122 of transit carriers and the Internet 132. In FIG. 1, the first device 102 of the originating network 101 is configured to send call signals 120 for a call, through the interconnect networks 122, to the second device 112 of the terminating network 111. The call signals 120 may include a call start signal, a call connect signal, and a call end signal.

The first registry 103 is configured to obtain, from the first device 102, call data 104 sent in a call signal 120 and to store the obtained call data 104 as an originating call record in its database. The call data 104 may include the calling A-number, the called B-number, a call event mark (e.g., a call start event, a call connect event, a call end event, etc.), etc. from the call signal. In some embodiments, the first registry 103 is also configured to obtain from the first device 102, and store, number portability information, roaming information, session identifier, SIP identity header, etc. associated with the call signal. In some embodiments, the first device 102 is configured to transmit the call data to the first registry 103 using a standard networking protocol, such as Remote Authentication Dial-In User Service (RADIUS), Diameter, Hypertext Transfer Protocol (HTTP), SIGTRAN, etc.

The second device 112 is configured to receive the call signal 120 transmitted, over the interconnect networks 122, from the first device 102. The second registry 113 is configured to obtain, from the second device 112, the call data 114 received in the call signal and to store the obtained call data 114 as a terminating call record in its database. The call data 114 may include the calling A-number, the called B-number, and a call event mark (e.g., a call start event, a call connect event, a call end event, etc.), etc. from the call signal. In some embodiments, the second registry 113 is also configured to obtain from the second device 112, and store, number portability information, roaming information, session identifier, a SIP identity header, etc. associated with the call signal. In some embodiments, the second device 112 is configured to transmit the call data to the second registry 113 using a standard networking protocol, such as RADIUS, Diameter, HTTP, SIGTRAN, etc.

The call data contained in a call signal 120 may sometimes be changed on its path from the first device 102 in the originating network 101 to the second device 112 in the terminating network 111. In some situations, the change may cause the call signal to be stopped or re-routed through the interconnect network 122, such that the call signal does not reach the second device 112. In other situations, a call signal received at the second device 112 may be configured so that it appears to have been sent from the first device 102, although the call signal was sent by a third-party device. Accordingly, for a call signal, discrepancies may exist between the originating call record stored in the first registry 103 and the terminating call record stored in the second registry 113. Often such situations occur as a result of intentional manipulation of the call signal to perform fraudulent activities with respect to the call, such as caller identifier (CLI) spoofing, short stopping, call stretching, interconnect bypass, private branch exchange (PBX) hack, robocalls, Wangiri, etc.

To detect such call signal manipulation, the first registry 103 and the second registry 113 are configured to perform a bi-directional handshake to exchange their records for a given call signal, over an encrypted out-of-band channel 134 configured between the first registry 103 and second registry 113 through the Internet 132. The encrypted out-of-band channel 134 is distinct from the network path used to transmit the call signals 120 through the interconnect network 122.

As part of the handshake exchange, the first registry 103 is configured to send a first verification request, over the out-of-band channel 134, to the second registry 113. The first verification request contains, as request data, information from the originating call record stored at the first registry 103 for the call signal. The first verification request may include the calling A-number, the called B-number, a call event mark (e.g., a call start event, an intermediate connect event, a call end event, etc.), the SIP identity header, number portability information, and roaming information associated with the call signal. In some embodiments, the first verification request may also include a session identifier of the call signal. The second registry 113 is configured to receive the first verification request and, in response, detect, by processing the request data: (i) whether a terminating call record exists in the second registry 113 that corresponds to the request data, and (ii) any discrepancy between such existing terminating call record and the request data. In some embodiments, the second registry 113 is configured to send the SIP identity header received in the first verification request to the second device 112.

The second registry 113 is configured to send, over the out-of-band channel 134 to the first registry 103, a first verification response based on such processing of the request data. The first verification response may include the calling A-number, the called B-number, a call event mark (e.g., a call start event, an intermediate connect event, a call end event, etc.), number portability information, roaming information associated with the call signal, and an indication of any detected discrepancy between the request data in the first verification request and the second registry records (e.g., no call record, PBX hack, CLI spoof, etc.). The first registry 103 is configured to receive the first verification response, and in response, detect, by processing the response data included in the first verification response, any discrepancy between the terminating call record in the second registry 113 and originating call record in the first registry 103.

Also as part of the handshake exchange, the second registry 113 is configured to send a second verification request, over the out-of-band channel 134, to the first registry 103. The second verification request contains, as request data, information from the terminating call record obtained and stored at the second registry 113 for the received call signal. The second verification request may include the calling A-number, the called B-number, a call event mark (e.g., a call start event, an intermediate connect event, a call end event, etc.), the SIP identity header, number portability information, and roaming information associated with the call signal. In some embodiments, the second verification request may also include a session identifier of the call signal.

The first registry 103 is configured to receive the second verification request and, in response, detect, by processing the request data: (i) whether an originating call record exists in the first registry 103 that corresponds to the request data, and (ii) any discrepancy between such existing originating call record and the request data. The first registry 103 is configured to send, over the out-of-band channel 134 to the second registry 113, a second verification response based on the processing of the request data. The second verification response may include the calling A-number, the called B-number, a call event mark (e.g., a call start event, an intermediate connect event, a call end event, etc.), number portability information, roaming information associated with the call signal, and an indication of any detected discrepancy between the request data in the second verification request and the first registry records (e.g., no call record, CLI spoof, etc.). The second registry 113 is configured to receive the second verification response, and in response, detect, by processing response data included in the second verification response, any discrepancy between the terminating call record in the second registry 113 and originating call record in the first registry 103.

The first registry 103 is configured to generate alerts 105 responsive to the data contained in the first verification response or second verification request indicating a discrepancy in the originating call record stored in the first registry 103. The first registry 103 is configured to send these alerts 105 to the first device 102 for taking actions with respect to the alerts. The second registry 113 is configured to generate alerts 115 responsive to the data contained in the first verification request or second verification response indicating a discrepancy in the terminating call record stored in the second registry 113. The first registry 103 is configured to send these alerts 115 to the first device 102 for taking actions with respect to the alerts. Such alerts are described in further detail in connection with FIGS. 4-11.

Figure 2:
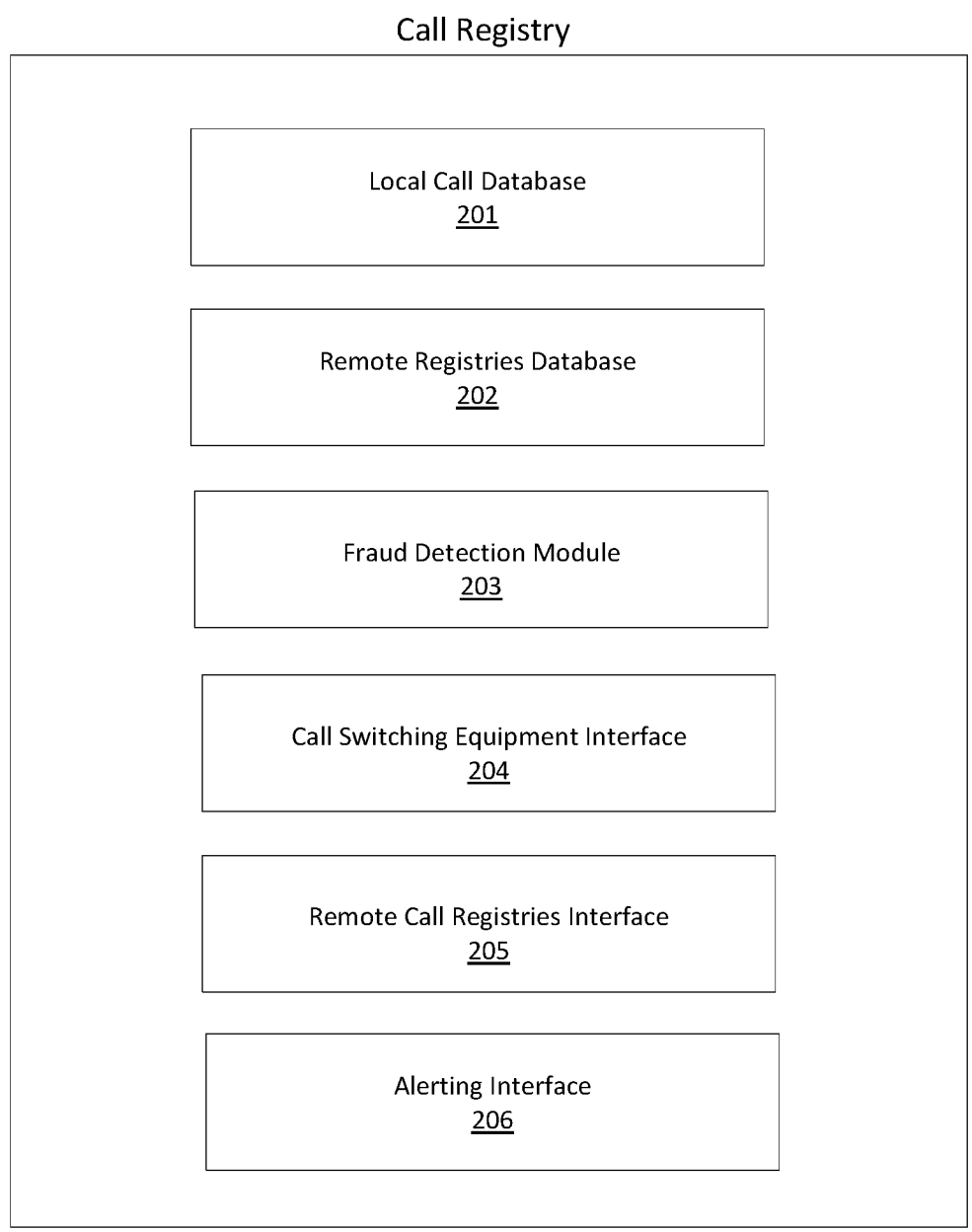
FIG. 2 is a block diagram showing components of a call registry, in accordance with embodiments of the present invention.

FIG. 2 is a block diagram showing components of a call registry, in accordance with embodiments of the present invention. In some embodiments, the first registry 103 of FIG. 1 is configured with these call registry components, and in some embodiments, the second registry 113 of FIG. 1 is configured with these call registry components.

The call registry components of FIG. 2 include a local database 201 to store call records associated with call signal data obtained from a local switching device. For example, the first registry 103 in FIG. 1 may store call signal data 104, obtained from local switching device 102, in its local database 201 as originating call records. The call registry components of FIG. 2 also include a remote registries database 202 to store data associated with remote call registries. For a given remote call registry, this database 202 may contain records including the E164 range associated with the remote call registry, the IP address assigned to the remote call registry, etc. Discovering and storing the IP address of a remote call registry is useful so that this information is available for sending a verification request, when needed, to that remote call registry. For example, for a received call signal, the called B-number in the call signal is attempted to be matched to the E164 ranges in its remote registries database 202. If a match is found, a verification request is sent to the IP address of the originating call registry corresponding to the matched E164 range in the database 202.

The call registry components of FIG. 2 further include a fraud detection module 203 configured with logic (e.g., hardware components, software instructions, etc.) to detect discrepancies, between the call data in the local database 201 and the call data received in verification requests and responses from remote registries, indicative of call fraud and generate associated alerts. Examples of fraud detected by the fraud detection module 203 is described in detail in connection with FIGS. 4-11.

The call registry components of FIG. 2 also include a call switching equipment interface 204 for the call registry to communicate with call switching devices. For example, the first registry 103 of FIG. 1 may use the call switching equipment interface 204 to communicate with the local switching device 102, such as obtaining from the device 102 call data 104 using a standard networking protocol (e.g., RADIUS, Diameter, HTTP, SIGTRAN, etc.).

The call registry components of FIG. 2 further include a remote registries interface 205 for the call registry to communicate with remote registries, such as by sending verification requests and verification responses to the remote registries. For example, the first registry 103 of FIG. 1 may use the remote registries interface 205 to send a first verification request, over the encrypted out-of-band channel 134, to the second registry 113.

The call registry components of FIG. 2 also include an alerting interface 206 for the call registry to send an alert, generated by the fraud detection module 203, to a local switching device or other external device for taking actions with respect to the alert. For example, the first registry 103 of FIG. 1 may use the alert interface 206 to send an alert 105 to the local switching device 102. In some embodiments, the call registry sends, by email, Slack message, etc., the alert to the personnel responsible for system administration. Optionally, the alert may include a control message to the local switching device to end the associated call. A call registry may include one or more processors that implement the call registry components.

Figure 3:
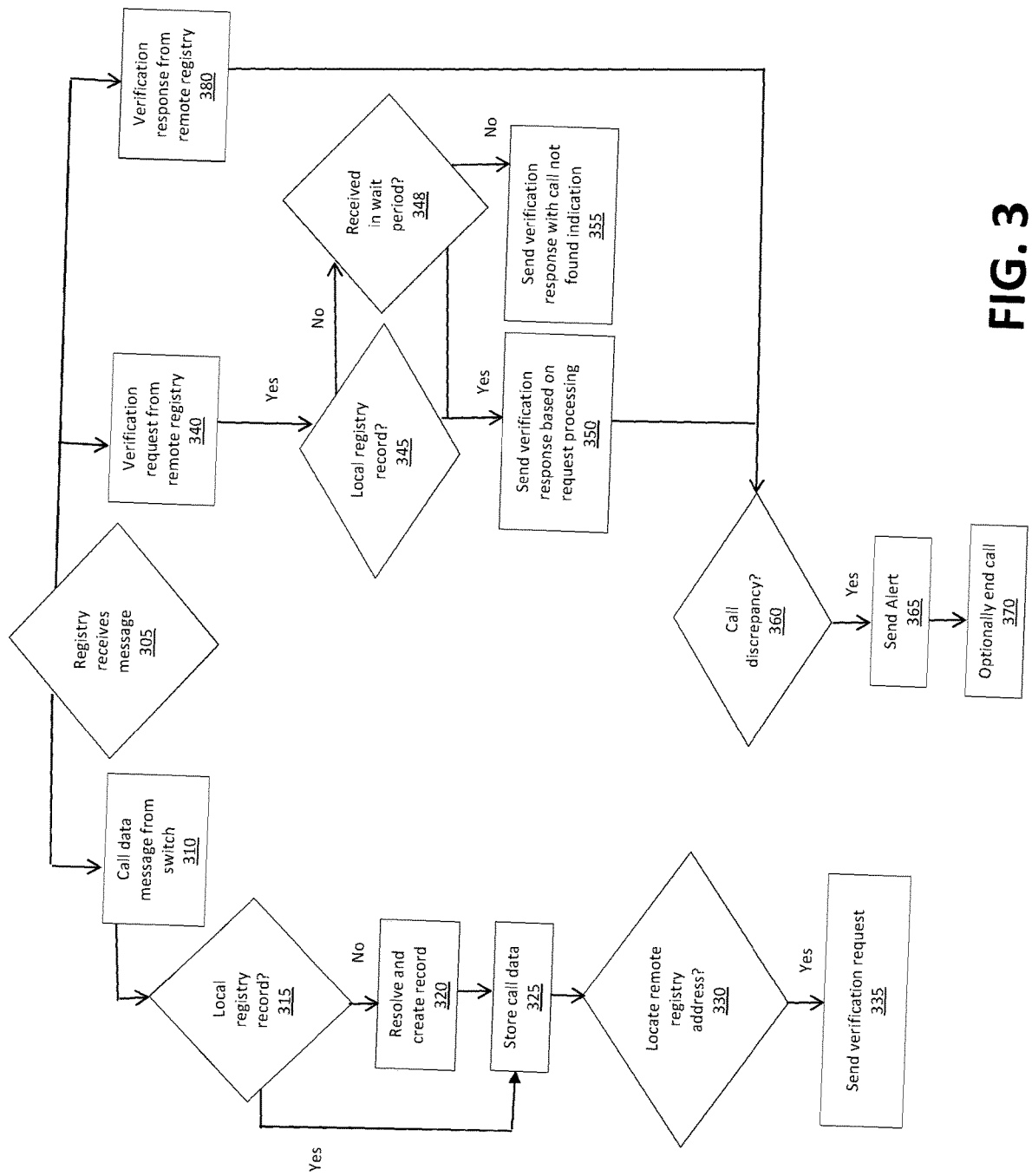
FIG. 3 is a flow chart depicting a method for processing, in real-time, messages received by a call registry, in accordance with embodiments of the present invention.

FIG. 3 is a block diagram depicting a method for processing call messages at a call registry in real-time, in accordance with embodiments of the present invention. The call registry of FIG. 3 is coupled to a local call switching device. The method processes the call messages to detect abnormalities in call signals transmitted as part of a voice call. In some embodiments, the first registry 103 of FIG. 1 uses the method of FIG. 3 to process call messages received from local switching device 102 and the second registry 113. Similarly, in some embodiments, the second registry 113 of FIG. 1 uses the method of FIG. 3 to process call messages received from local switching device 112 and the first registry 103.

The method of FIG. 3 begins at step 305 by the registry (local registry) receiving a message, which is analyzed by the local registry to determine the type of message. If, at step 310, the message is found to be a call signal message received from the local switching device, the method checks 315 the local registry database to determine whether a record exists for the associated call. Note, that in some embodiments, the local switching device transmits the message to the local registry using a standard networking protocol, such as RADIUS, Diameter, HTTP, SIGTRAN, etc. If no such record exists, at step 320, the method resolves the call data and creates a new call record. In some embodiments, to resolve the call data, the method, at step 315, may obtain number portability information, roaming information, session identifier, the SIP identity header, etc. associated with the call signal from the local switching device. The method, at 325, stores the call data of the call signal in the new or existing call record in the local registry database. The call data may include one or more of a calling A-number, a called B-number, a call event mark (e.g., call start event, call connect event, call end event), number portability information, roaming information, session identifier, the SIP identity header, etc.

At step 330, the method locates the registry address for the remote registry coupled to the remote switching device associated with the call signal. For example, if local registry is in the terminating network, then the remote registry is coupled to the switching device, in the originating network, that sent the call signal. In some embodiments, the registry address is a host address (e.g., IP address) that is located by matching the calling A-number and/or the called-B number in the call record to a corresponding E164 ranges. At step 330, the method sends a verification request to the remote registry at the located registry address. The method, at step 330, includes data from the stored call record so that the remote registry can confirm that consistent data for the call signal is stored in the remote registry's database. This data may include one or more of a calling A-number, a called B-number, a call event mark (e.g., call start event, call connect event, call end event), number portability information, roaming information, session identifier, the SIP identity header, etc.

If, at step 340, the message is instead found to be a verification request received from a remote registry, the method checks 345 the local registry database to determine whether a call record exists that corresponds to the data contained in the verification request. This data may include one or more of a calling A-number, a called B-number, a call event mark (e.g., call start event, call connect event, call end event), number portability information, roaming information, session identifier, the SIP identity header, etc. If no such call record exists, the method, at step 348, the method waits a predetermined period of time for corresponding call data to be received from the switch (step 310) and stored as a call record. The method may set a timer to indicate the expiration of the wait period. If the call data is not received during the wait period, at step 355, the method sends a verification response, to the remote registry, with a call not found indication. If a record does exist or call data is receiving during the wait period, at step 350, the method sends a verification response based on the request processing.

If a record does exist or call data is receiving during the wait period, at step 360, the method also checks whether a discrepancy exists between the call record and the data contained in the verification request. For example, a discrepancy between the calling A-number in the call record and the calling A-number contained in the verification request. If such discrepancy exists, at step 365, the method sends an alert to the local switching device for taking actions with respect to the alert. Optionally, at step 370, as part of the alert, the method may send a control message to the local switching device to end the call associated with the verification request. In some embodiments, the SIP identity header contained in the verification request is sent to the local switching device.

If, at step 380, the message received at the local registry is instead found to be a verification response received from a remote registry, at step 360, the method checks whether the verification response indicates a call discrepancy. For example, the verification response may indicate that no call record exists in the remote registry corresponding to a verification request sent by the local registry. If such a discrepancy is indicated, at step 365, the method sends an alert to the local switching device for taking actions with respect to the alert. Optionally, at step 370, as part of the alert, the method may send a control message to the local switching device to end the call associated with the verification response.

Figure 4A:
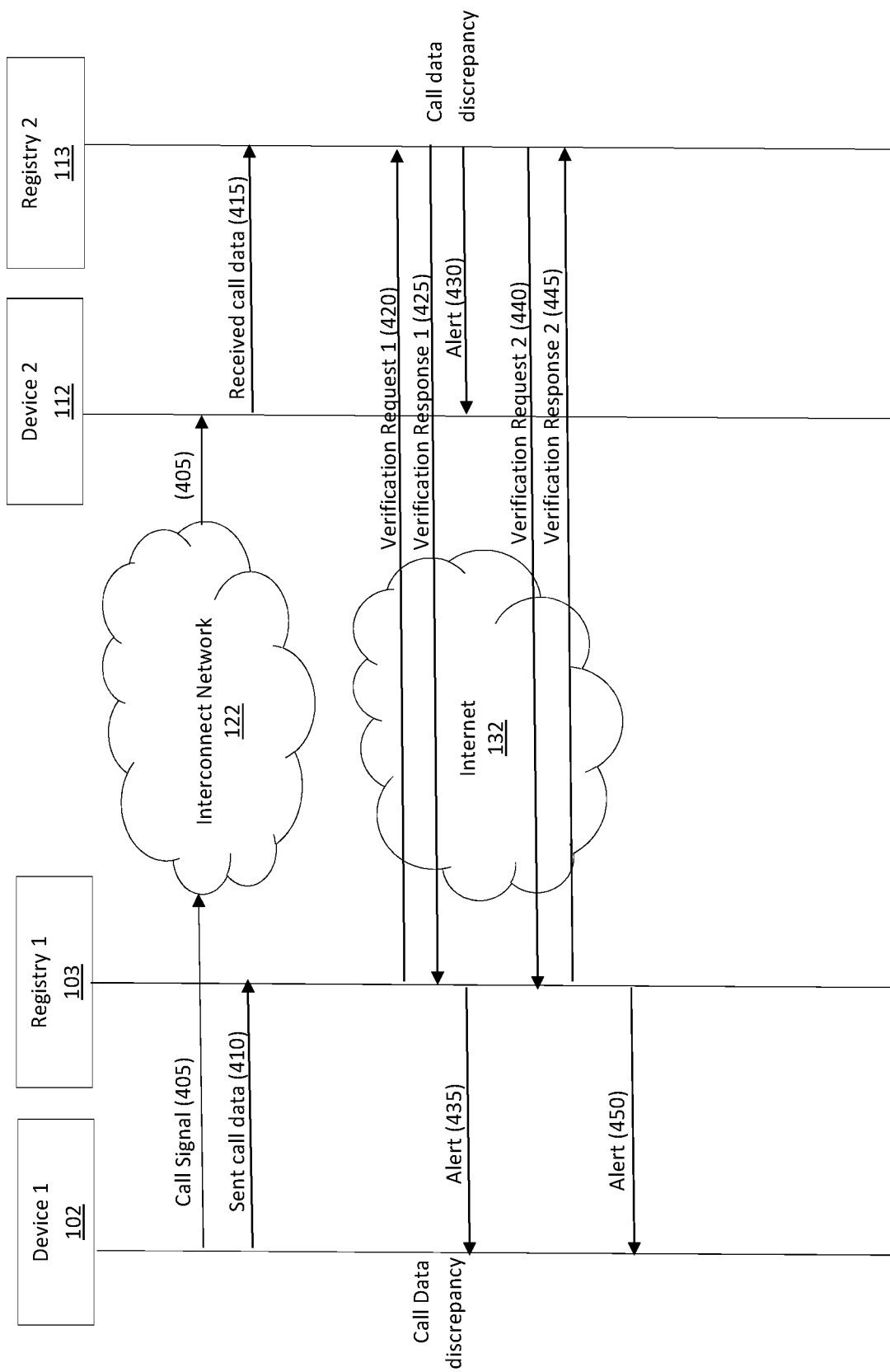
FIG. 4A is a sequence diagram depicting logic flow for generating alerts based on the detection of discrepancies between originating call data and terminating call data associated with a call signal, in accordance with embodiments of the present invention.

FIG. 4A is a sequence diagram depicting logic flow for generating alerts based on the detection of discrepancies between originating call data and terminating call data associated with a call signal, in accordance with embodiments of the present invention. The sequence diagram depicts example logic flow within the computer system of FIG. 1.

The logic flow begins by the first switching device 102 in the originating network sending a call signal 405, over the interconnect network 122, to the second switching device 112 in the terminating network. In the embodiment of FIG. 4A, the data in the call signal 405 is manipulated prior to reaching the second switching device 112. For example, the call signal 405 may be spoofed by changing the calling A-number contained in the call signal. The first device 102 sends call data 410 contained in the sent call signal to the first registry 103, which stores the call data 410 as an originating call record in its local database. The second device 112 sends call data 415 contained in the received call signal to the second registry 113, which stores the call data 415 as a terminating call record in its local database. Due to the manipulation of the call signal 405, a discrepancy exists between the originating call record in the first registry's database and the terminating call record in the second registry's database.

The first registry 103 sends, over the out-of-band channel 134, a first verification request 420 to the second registry 113. The first verification request 420 includes data from the originating call record stored in the first registry's local database. This data may include one or more of a calling A-number, a called B-number, a call event mark (e.g., call start event, call connect event, call end event), number portability information, roaming information, session identifier, the SIP identity header, etc.

The second registry 113 receives the first verification request 420 from the first registry 103, and determines that a discrepancy exists between the data in the first verification request 420 and the originating call record stored in the second registry's database. The second registry 113 sends, over the out-of-band channel 134, a first verification response 425 with an indication of the discrepancy to the first registry 103. The second registry 113 also sends an alert 430 to the second device 112 for taking actions with respect to the alert. If the discrepancy is between an A-calling number in the first verification request and an A-calling number in the corresponding terminating call record in the second registry's database, the alert 430 sent to the second device 112 is a spoofing alert. If the terminating call record has a local A-number, the alert 430 sent to the second device 112 is a interconnect bypass alert.

In some scenarios, the first verification request 420 arrives from the first registry 103 prior to the call data 415 arriving from the second device 112. In these scenarios, the second registry 113 may wait a predetermined period of time for the arrival of the call data 415 before responding to the first verification request 420. A timer may be used to indicate the expiration of the predetermined period of time.

Responsive to receipt of the first verification response 425 indicating the discrepancy, the first registry 103 sends an alert 435 to the first device 102 for taking actions with respect to the alert. If the discrepancy is between the calling A-number in the terminating call record and the calling A-number in the corresponding originating call record, the alerts 430 and 435 sent to the devices are spoofing alerts. In some embodiments, the second registry 113 is configured to send the SIP identity header received in the first verification request to the second device 112.

The second registry 113 sends, over the out-of-band channel 134, a second verification request 440 to the first registry 103. The second verification 440 request includes data from the terminating call record stored in the second registry's local database. This data may include one or more of a calling A-number, a called B-number, a call event mark (e.g., call start event, call connect event, call end event), number portability information, roaming information, session identifier, the SIP identity header, etc. The first registry 103 receives the second verification request 440 from the second registry 113 and determines that a discrepancy exists between the data in the second verification request and the terminating call record stored in the first registry's database.

The first registry 103 sends, over the out-of-band channel 134, a second verification response 445 with an indication of the discrepancy to the second registry 113. The first registry 103 also sends an alert 450 to the first device 102 for taking actions with respect to the alert. In some embodiments, if the discrepancy is between a call end event in the second verification request and a call end event in the originating call record in the first registry's database, the alert 450 sent to the first device 102 is a call stretching alert. In some embodiments, if the call signal 405 is associated with a call start event, and the discrepancy is between an A-calling number in the second verification request and an A-calling number in the originating call record in the first registry's database, the alert 450 sent to the first device 102 is a spoofing alert.

Note, some embodiments the communication sequence may vary from the sequence depicted in FIG. 4A. For example, the second registry 113 may send the second verification request 440 before sending the first verification response 425. For another example, the second registry 113 may send the alert 430 before sending the first verification response 425.

Also note, in some cases, the local registry may generate some alerts based on the verification request received from a remote registry for a call signal, or the verification response received from the remote registry for that call signals. In some embodiments, for these cases, the local registry generates these alerts based on whichever of these messages is received first from the remote registry.

FIG. 4B is a sequence diagram depicting logic flow for generating alerts based on the detection of discrepancies between originating call data, terminating call data, and third-party data associated with a call signal, in accordance with embodiments of the present invention.

The logic flow begins by the first switching device 102 in the originating network sending a call signal 455, over the interconnect network 122, to the second switching device 112 in the terminating network. In the embodiment of FIG. 4B, the data in the call signal 455 is manipulated prior to reaching the second switching device 112. In particular, the call signal 455 is spoofed by changing the calling A-number contained in the call signal to the calling A-number of the third device 116. The first device 102 sends call data 460 contained in the sent call signal to the first registry 103, which stores the call data 460 as an originating call record in its local database.

The first registry 103 sends, over the out-of-band channel 134, a first verification request 465 to the second registry 113. The first verification request 465 includes data from the originating call record stored in the first registry's local database. This data may include one or more of a calling A-number, a called B-number, a call event mark (e.g., call start event, call connect event, call end event), number portability information, roaming information, session identifier, the SIP identity header, etc. The second device 112 also sends call data 470 contained in the sent call signal to the second registry 113, which stores the call data 470 as an originating call record in its local database.

Due to the manipulation of the call signal 455, the second registry 113 sends a verification request 475 to the third registry 117 communicatively coupled to the third device 116. As the third device 116 did not actually originating the call signal 455, the third registry 117 does not have a call record corresponding to the call signal 455, and sends a verification response 480 to the second registry 113 indicating no call data found in the third registry 117. Based on the verification response 480, the second registry 113 detects that the calling A-number in the call signal 455 was spoofed and sends a first verification response 485 to the first registry 103 with a call spoof mark. The second registry 113 also sends a call spoofing alert 490 to the second device 112 for taking actions with respect to the alert. Responsive to receipt of the first verification response 485, the first registry 103 similarly sends a call spoofing alert 495 to the first device 102 for taking action with respect to the alert.

Figure 5:
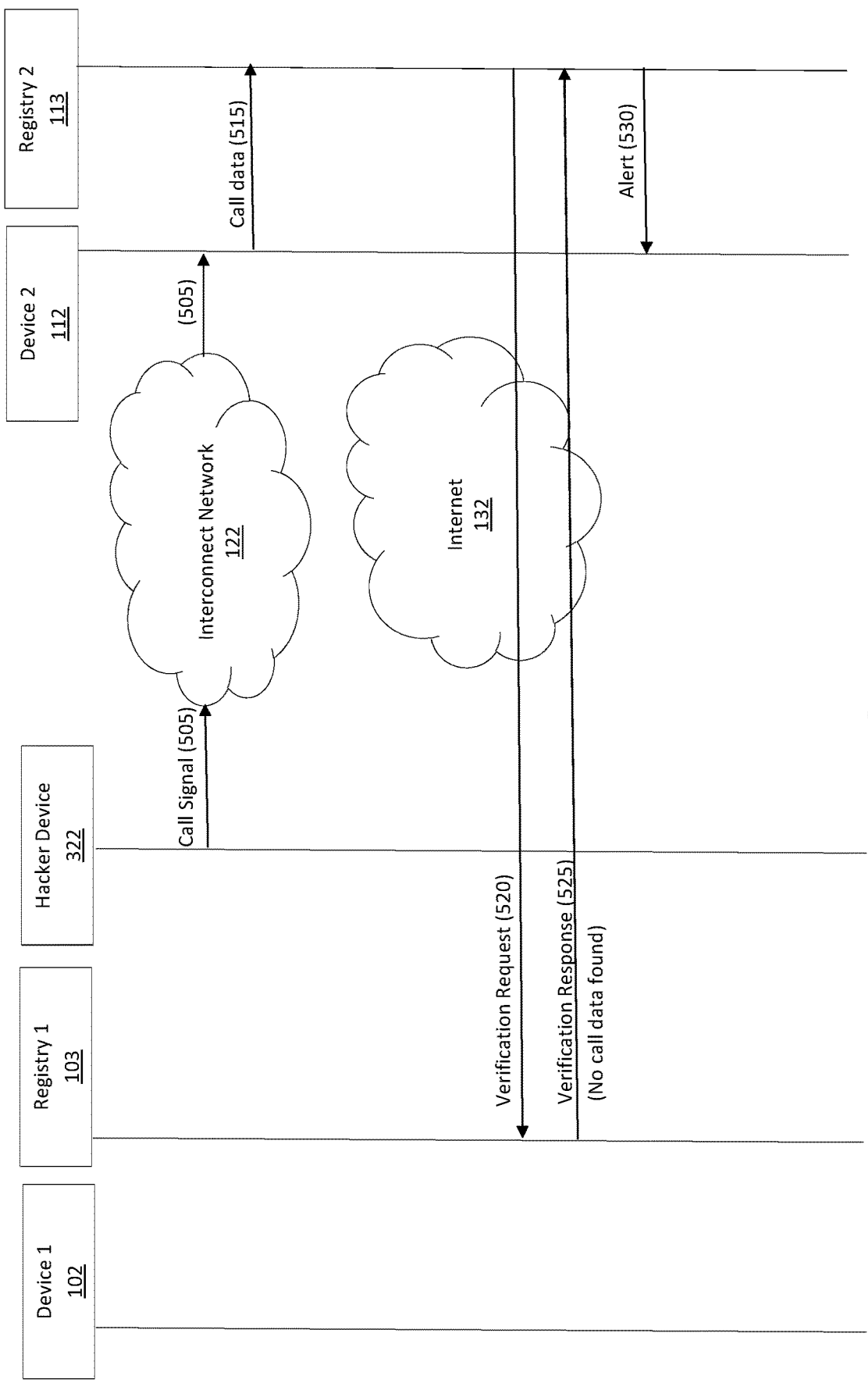
FIG. 5 is a sequence diagram depicting logic flow for generating alerts based on the detection of no originating call record being associated with a call signal, in accordance with embodiments of the present invention.

FIG. 5 is a sequence diagram depicting logic flow for generating alerts based on the detection of no originating call record associated with a call signal, in accordance with embodiments of the present invention. The sequence diagram depicts example logic flow within the computer system of FIG. 1.

The logic flow begins by a third-party hacker device 322 sending a call signal 505, over the interconnect network 122, to the second switching device 112 in the terminating network. The hacker device 322 configures the call signal 505 such that the call signal 505 appears to have originated from the first switching device 102 in the originating network. The second device 112 sends the call data 515 contained in the received call signal 505 to the second registry 113, which stores the call data as a terminating call record in its local database.

The second registry 113 sends, over the out-of-band channel 134, a verification request 520 to the first registry 103. The verification request 520 includes data from the terminating call record stored in the second registry's local database. This data may include one or more of a calling A-number, a called B-number, a call event mark (e.g., call start event, call connect event, call end event), number portability information, roaming information, session identifier, the SIP identity header, etc. The first registry 103 receives the verification request 520 from the second registry 113 and determines that a no originating call record exists in its local database that corresponds to the data contained in the verification request 520. In response, the first registry 103 sends, over the out-of-band channel 134, a verification response 525 with an indication of no originating call data found in the first registry 103.

Figure 6:
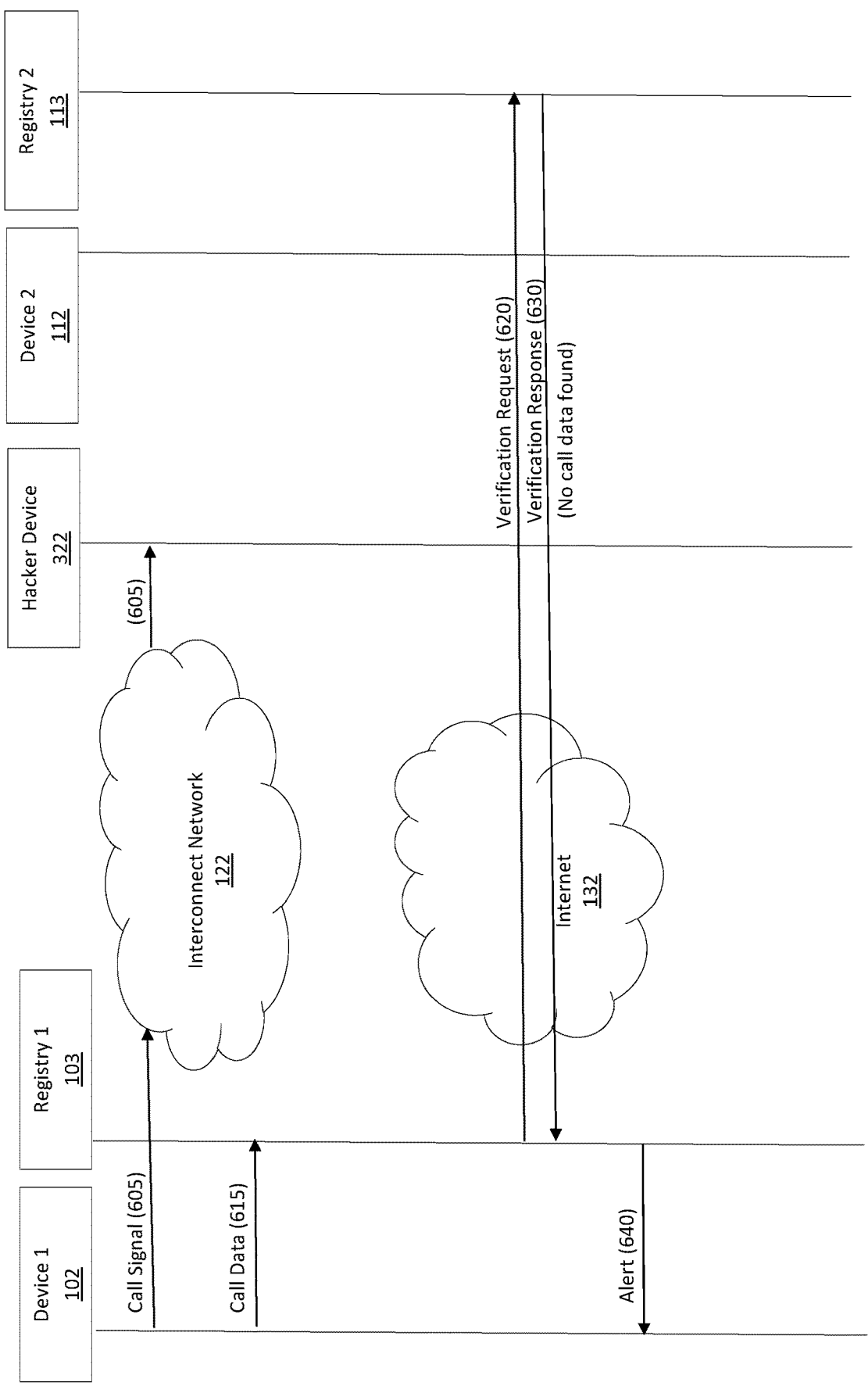
FIG. 6 is a sequence diagram depicting logic flow for generating alerts based on the detection of no terminating call record being associated with a call signal, in accordance with embodiments of the present invention.

Responsive to receipt of the verification response 525 indicating no originating call data found, the second registry 113 sends an alert 530 to the second device 112 for taking actions with respect to the situation of the call signal not actually originating from the first device 102. In some embodiments, the alert 530 is an unconfirmed call alert indicating a robocall, Wangiri scam, etc FIG. 6 is a sequence diagram depicting logic flow for generating alerts based on the detection of no terminating call record associated with a call signal, in accordance with embodiments of the present invention. The sequence diagram depicts example logic flow within the computer system of FIG. 1.

The logic flow begins by the first switching device 102 in the originating network sending a call signal 605, over the interconnect network 122, to the second switching device 112 in the terminating network. A hacker device 322 intercepts the call signal 605, such that the call signal 605 never reaches the second switching device 112. For example, the hacker device 322 may re-route the call signal 605 to a switching device in another call network. The first device 102 sends the call data 615 contained in the sent call signal 605 to the first registry 103, which stores the call data as an originating call record in its local database. As the call signal 605 never reached the second device 112, no terminating call record is stored in the second registry 113 for the call signal 605.

The first registry 103 sends, over the out-of-band channel 134, a verification request 620 to the second registry 113. The verification request 620 includes data from the terminating call record stored in the first registry's local database. This data may include one or more of a calling A-number, a called B-number, a call event mark (e.g., call start event, call connect event, call end event), number portability information, roaming information, session identifier, the SIP identity header, etc. The second registry 113 receives the verification request 620 from the second registry 113 and determines that a no terminating call record exists in its local database that corresponds to the data contained in the verification request 620. In response, the second registry 113 sends, over the out-of-band channel 134, a verification response 630 with an indication of no terminating call data found in the second registry 113. In some embodiments, the second registry 113 may wait a predetermined period of time for corresponding data to arrive from the second device 112 prior to sending the verification response 630.

Responsive to receipt of the verification response 630 indicating no terminating call data found, the first registry 103 sends an alert 640 to the first device 102 for taking actions with respect to the situation of the call signal not reaching the second device 112. In some embodiments, if the call signal 605 is associated with a call start event, the alert 640 is a short stopping alert. In some embodiments, if the call signal 605 is associated with call connect event, the alert 640 is a false answer supervision alert.

Figure 7:
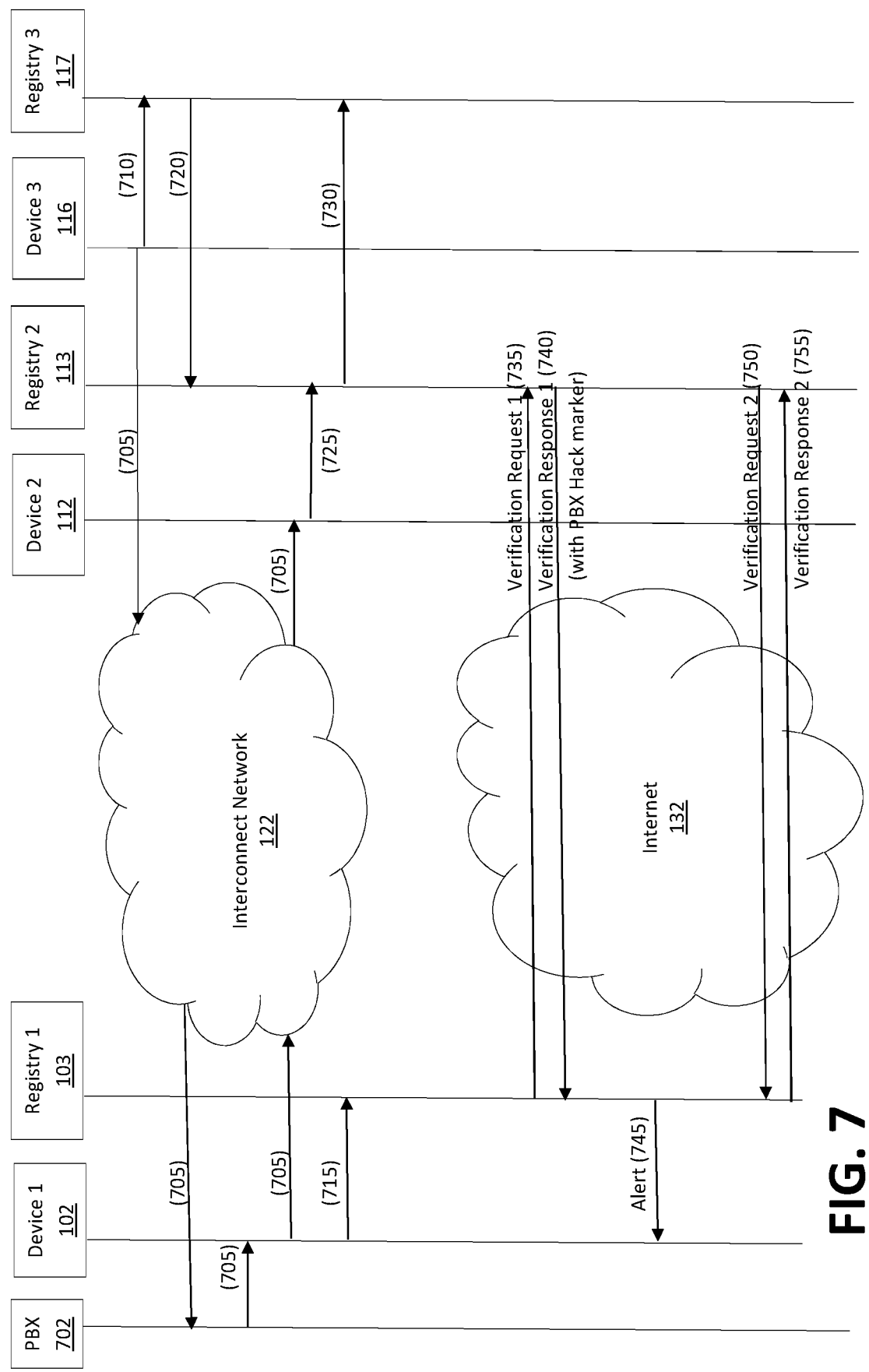
FIG. 7 is a sequence diagram depicting logic flow for generating alerts based on the detection of a PBX hack, in accordance with embodiments of the present invention.

FIG. 7 is a sequence diagram depicting logic flow for generating alerts based on the detection of a PBX hack, in accordance with embodiments of the present invention. The sequence diagram depicts example logic flow within the computer system of FIG. 1.

In the logic flow, a third switching device 116, in the call network of a third operator, initiates a legitimate call destined to the second switching device 112. To do so, the third switching device sends, over the interconnect network 122, a call signal 705 with the calling A-number of the third switching device 116 and called B-number of the second switching device 112. A carrier in the interconnect network 122 redirects the call signal 705 in to the PBX 702 in the call network of the first switching device 102, and thus changes the calling A-number in the call signal 705 to the call A-number assigned to the first device 102. Based on the changed call data in the call signal 705, the PBX 702 sends the call signal 705 to the first device 102, which in turn sends the call signal to the second device 112.

In response to sending the call signal 705, the third device 116 sends the call data 710 contained in the sent call signal 705 to the third registry 117, which stores the call data 710 as an originating call record in its local database. In response to receiving the call signal 705, the first device 102 sends the call data 715 contained in the received call signal 705 to the first registry 103, which stores the call data as an originating call record in its local database. The third registry 117 then sends a third-party verification request 720 of the call data 710 to the second registry 113, and the second device 112 also sends the call data 725 received from the first device 102 to the second registry 113, which stores the call data as an originating call record in its local database. Based on the discrepancy in the calling A-numbers in the verification request from the third registry 117 and the originating call record of the call signal 705 from the first device 102, the second registry 113 sends a verification response to the third registry 117 indicating call spoofing of the call signal 705.

The first registry 103 sends a first verification request 735 to the second registry 113. The first verification request 735 includes data from the originating call record stored in the first registry's local database. The second registry 113 receives the first verification request 735 from the first registry 103 and determines that the terminating call record matches the data in the first verification request 735. The second registry 113 also determines that the data in the third-party verification request 720 from the third registry 117 matched the called B-number in the terminating call record, but a discrepancy existed between the calling A-number in the third-party verification request 720 and the calling A-number in the terminating call record. Based on these determinations, the second registry 113 detects a PBX hack occurred with respect to the call signal 705

The second registry 113 sends a first verification response 740 with a PBX hack mark indicative of the detected PBX hack of the call signal 705. Responsive to receipt of the first verification response 740, the first registry 103 sends a PBX hack alert 745 to the first device 102 for taking actions with respect to the alert.

The second registry 113 also sends a second verification request 750 to the first registry 103 containing data from the terminating call record in the second registry's database. The first registry 103 receives the second verification request 440 from the second registry 113 and determines that a discrepancy (in the calling A-number) exists between the data in the second verification request 750 and the originating call record stored in the first registry's database. The first registry 103 sends a second verification response 745 with an indication of the discrepancy to the second registry 113. In some embodiments, the second registry 113 may also generate an alert based on the discrepancy.

Figure 8:
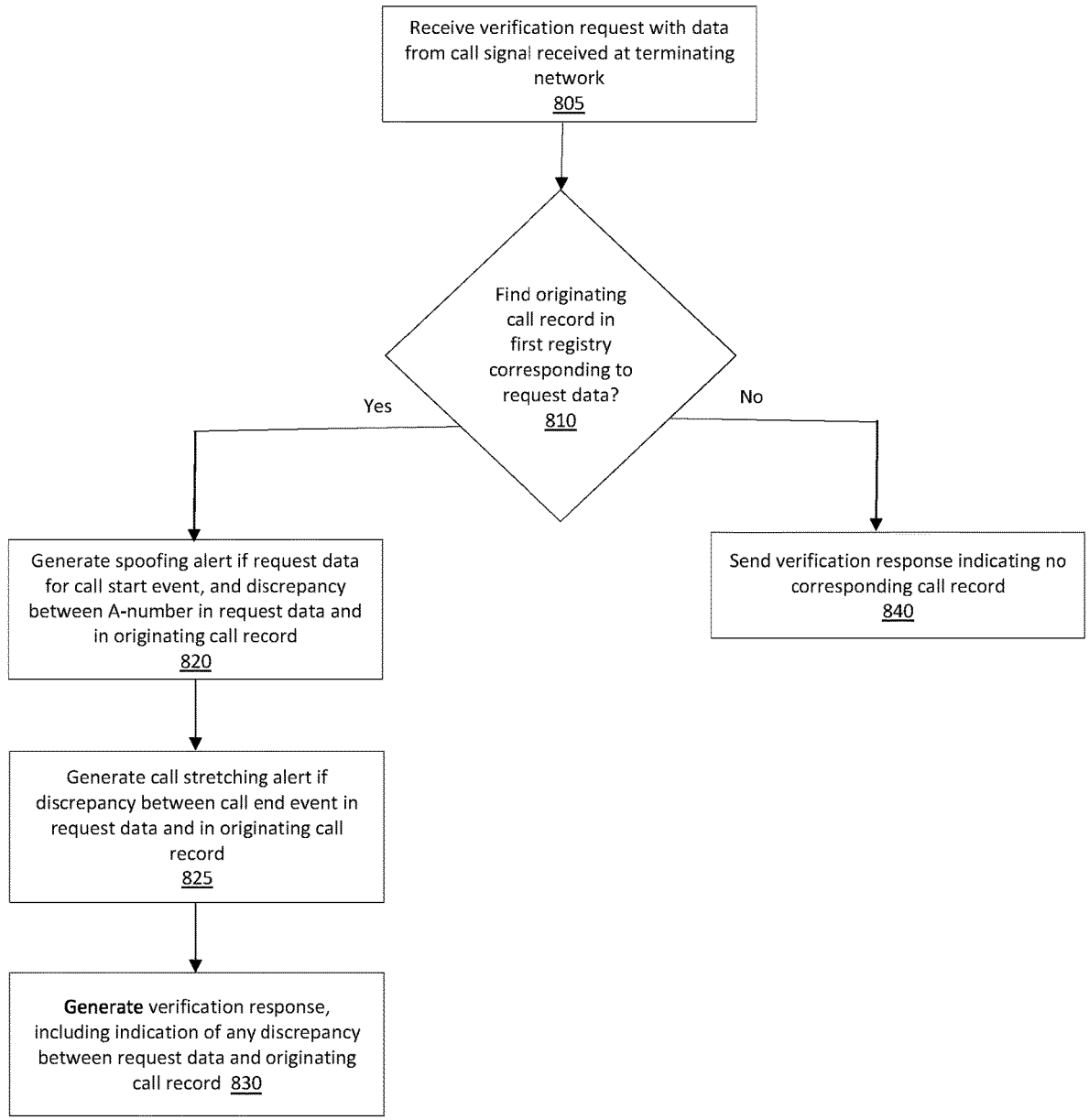
FIG. 8 is a flow chart depicting a method for processing verification requests by a call registry in an originating call network, in accordance with embodiments of the present invention.

FIG. 8 is a flow chart depicting a method for processing verification requests by a call registry in an originating call network, in accordance with embodiments of the present invention. The call registry (local registry) is communicatively coupled to a call switching device in the originating call network. In some embodiments, the method of FIG. 8 is performed by the first call registry 103 of FIG. 1.

The method begins at step 805 by the local registry receiving, from a remote registry in a terminating call network, a verification request to verify a call signal received at a call switching device in the terminating call network. The verification request contains, as request data, the call data in the call signal received at the terminating call network. The method, at step 810, checks the local registry's database to find an originating call record that corresponds to the request data in the verification request. If no such call record is found, at step 840, the local registry sends, to the remote registry, a verification response indicating no corresponding call record in the local registry's database.

If an originating call record is found, at step 820, the method checks if the request data is for a call start event. If so, the method further checks if a discrepancy exists between the calling A-number in the request data and the calling A-number in the originating call record. If such discrepancy exists, the method generates a spoofing alert that is transmitted to the communicatively coupled switching device to take action with respect to the alert, such as ending the associated call.

At step 825, the method checks if the request data is for a call end event. If so, the method checks if a discrepancy exists between the call end event in the request data and the call end event in the originating call record. If such discrepancy is present, the method generates a call stretching alert that is transmitted to the communicatively coupled switching device to take action with respect to alert, such as ending the associated call. At step 830, the method generates a verification response, which includes an indication of any discrepancy between the request data and originating call record, such as a discrepancy in the calling A-number, in the call end event, etc.

Figure 9:
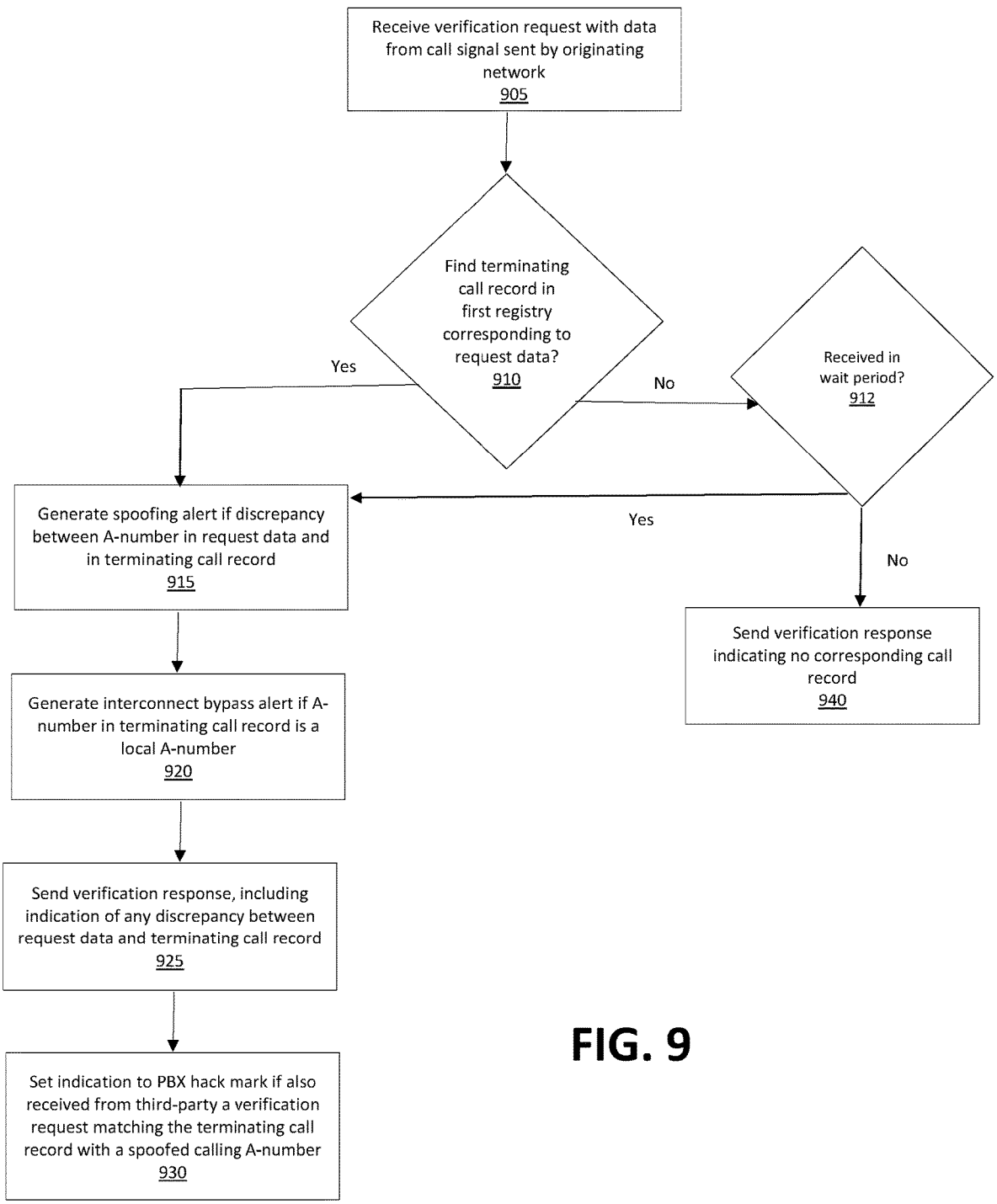
FIG. 9 is a flow chart depicting a method for processing verification requests by a call registry in a terminating call network, in accordance with embodiments of the present invention.

FIG. 9 is a flow chart depicting a method for processing verification requests by a call registry in a terminating call network, in accordance with embodiments of the present invention. The call registry (local call registry) is communicatively coupled to a call switching device in the terminating call network. In some embodiments, the method of FIG. 9 is performed by the first call registry 103 of FIG. 1.

The method begins at step 905 by the local registry receiving, from a remote registry in a terminating call network, a verification request to verify a call signal sent from a call switching device in the originating network. The verification request contains, as request data, the call data in the call signal sent by the originating call network. The method, at step 910, checks the registry's database to find a terminating call record that corresponds to the request data in the verification request. If no such call record is found, at step 912, the method waits a predetermined period of time for corresponding call data (from a call signal) to be received from the switching device and stored in a terminating call record. The method may set a timer to indicate the expiration of the wait period. If the call data is not received during the wait period, at step 940, the local registry sends, to the remote registry, a verification response indicating no corresponding call record in the local registry's database.

If a terminating call record is found or call data is received during the wait period, at step 915, the method checks if a discrepancy exists between the calling A-number in the request data and the calling A-number in the terminating call record. If such discrepancy exists, the method generates a spoofing alert that is transmitted to the communicatively coupled switching device to take action with respect to the alert. At step 920, the method further checks if the A-number in the terminating call record is a local A-number. If so, the method generates an interconnect bypass alert that is transmitted to the communicatively coupled switching device to take action with respect to the alert.

At step 925, the method generates a verification response, which includes an indication of any discrepancy between the request data and terminating call record, such as a discrepancy in the calling A-number, etc. At step 930, the method checks the local registry's database to determine if a third-party also sent a verification request containing request data matching to the terminating call record, but with a spoofed calling A-number. If so, the method sets the indication in the verification response to include a PBX hack mark.

Figure 10:
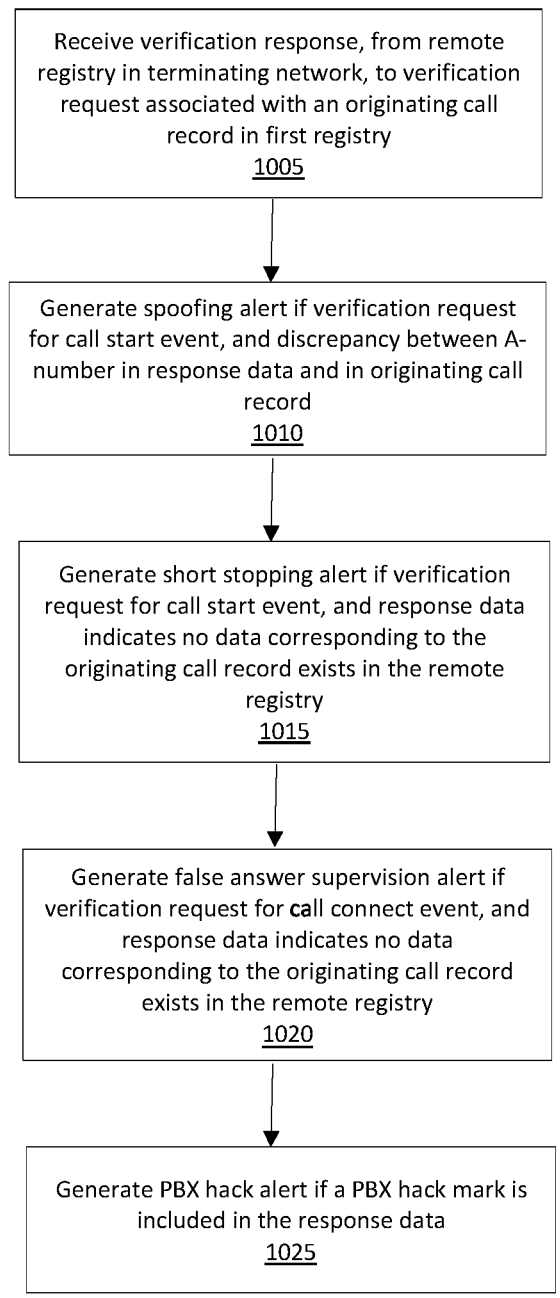
FIG. 10 is a flow chart depicting a method for processing verification responses by a call registry in an originating call network, in accordance with embodiments of the present invention.

FIG. 10 is a flow chart depicting a method for processing verification responses by a call registry in an originating call network, in accordance with embodiments of the present invention. The call registry (local registry) is communicatively coupled to a call switching device in the originating call network. In some embodiments, the method of FIG. 8 is performed by the first call registry 103 of FIG. 1.

The method begins at step 1005 by the local registry receiving, from a remote registry in a terminating call network, a verification response. The receipt of the verification response is based on a verification request sent by the local registry to verify a call signal sent by the communicatively coupled call switching device to the terminating network. The call data of this call signal is stored in the local registry as an originating call record. The verification response contains, as response data, the call data in the call signal received at the terminating call network.

At step 1010, the method checks if the response data is for a call start event. If so, the method further checks if a discrepancy exists between the calling A-number in the response data and the calling A-number in the originating call record. If such discrepancy exists, the method generates a spoofing alert that is transmitted to the communicatively coupled switching device to take action with respect to the call spoofing. At step 1015, the method checks if the response data is for a call start event. If so, the method further checks the response data for an indication of no data corresponding to the originating call record exists in the remote registry. If such indication exists, the method generates a short stopping alert that is transmitted to the communicatively coupled switching device to take action with respect to the short stopping.

At step 1020, the method checks if the response data is for a call connect event. If so, the method further checks the response data for an indication of no data corresponding to the originating call record exists in the remote registry. If such indication is present, the method generates a false answer supervision alert that is transmitted to the communicatively coupled switching device to take action with respect to this alert. At step 1025, the method checks if a PBX hack mark is included in the response data. If such indication is present, the method generates a PBX hack alert that is transmitted to the communicatively coupled switching device to take action with respect to this alert.

Figure 11:
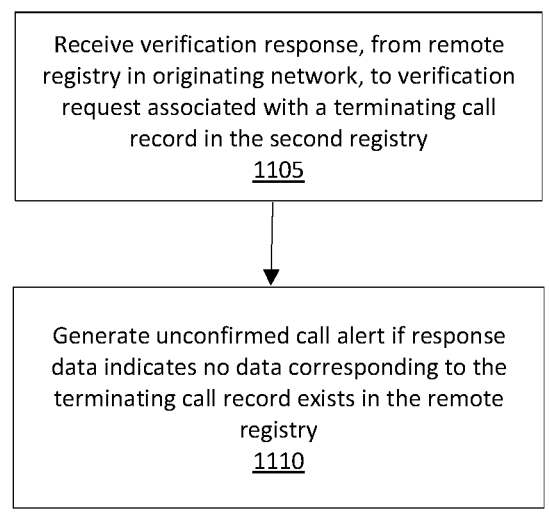
FIG. 11 is a flow chart depicting a method for processing verification responses by a call registry in a terminating call network, in accordance with embodiments of the present invention.

FIG. 11 is a flow chart depicting a method for processing verification requests by a call registry in a terminating call network, in accordance with embodiments of the present invention. The call registry (local registry) is communicatively coupled to a call switching device in the terminating call network. In some embodiments, the method of FIG. 11 is performed by the second call registry 113 of FIG. 1.

The method begins at step 1105 by the local registry receiving, from a remote registry in an originating call network, a verification response. The receipt of the verification response is based on a verification request sent by the local registry to verify a call signal received by the communicatively coupled call switching device from the originating call network. The call data of this call signal is stored in the local registry as a terminating call record. The verification response contains, as response data, the call data in the call signal sent by the originating call network.

At step 1110, the method checks if the response data for an indication of no data corresponding to the terminating call record exists in the remote registry. If such indication is present, the method generates an unconfirmed call alert that is transmitted to the communicatively coupled switching device to take action with respect to the alert.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computer-implemented network verification system comprising:
   a first device situated in an originating call network, the first device configured to send call signals to a second device situated in an terminating call network, wherein the second device is coupled to a second registry that stores call signals' data received at the second device as terminating call records; and
   a first registry coupled to the first device and configured to, in real-time:
      obtain, from the first device, call data sent in a call signal and a SIP identity header associated with the call signal, and store as an originating call record in the first registry;
      send, to the second registry over the out-of-band verification network, a first verification request containing the originating call record, and receive a first verification response, wherein the second registry is configured to send the SIP identity header contained in the first verification request to the second device; and
      receive, from the second registry over the out-of-band verification network, a second verification request containing a terminating call record that includes a SIP identity header associated with the call signal, and send a second verification response.

2. The system of claim 1, wherein call data contained in a call signal includes a calling A-number, a called B-number, and a call event mark.

3. The system of claim 1, wherein the first registry is further configured to obtain, from the first device, number portability information and roaming information associated with the obtained call data.

4. The system of claim 1, wherein the first verification request and second verification request include a calling A-number, a called B-number, a call event mark, number portability information, and roaming information associated with a call signal.

5. The system of claim 1, wherein the first verification response and second verification response include a calling A-number, a called B-number, a call event mark, number portability information, and roaming information associated with a call signal.

6. The system of claim 1, wherein the obtained call data is transmitted from the first device to the first registry by a standard networking protocol, including RADIUS, Diameter, HTTP, or SIGTRAN.

7. The system of claim 2, wherein the first registry is further configured to match a called-B number in the originating call record to corresponding E164 ranges so as to identify a host address of the second registry to send the first verification request.

8. A computer-implemented network verification system comprising:
   a second device situated in a terminating call network, the second device configured to receive a call signal from a first device situated in an originating network, wherein the first device is coupled to a first registry that stores call signals' data sent from the first device as originating call records; and
   a second registry coupled to the second device and configured to, in real-time:
      obtain, from the second device, call data received in a call signal and a SIP identity header associated with the call signal, and store as a terminating call record in the second registry;
      send, to the first registry over the out-of-band verification network, a second verification request containing the terminating call record, and receive a second verification response;
      receive, from the first registry over the out-of-band verification network, a first verification request that contains an originating call record that includes a SIP identity header associated with the call signal, and send a first verification response; and
      send the SIP identity header contained in the first verification request to the second device.

9. The system of claim 8, wherein call data contained in a call signal includes a calling A-number, a called B-number, and a call event mark.

10. The system of claim 8, the second registry is further configured to obtain, from the second device, number portability information and roaming information associated with the obtained call data.

11. The system of claim 8, wherein the first verification request and second verification request include a calling A-number, a called B-number, a call event mark, number portability information, and roaming information associated with a call signal.

12. The system of claim 8, wherein the first verification response and second verification response include a calling A-number, a called B-number, a call event mark, number portability information, and roaming information associated with a call signal.

13. The system of claim 8, wherein the obtained call data is transmitted from the second device to the second registry by a standard networking protocol, including RADIUS, Diameter, or HTTP.

14. The system of claim 9, wherein the second registry is further configured to match a calling A-number in the terminating call record to corresponding E164 ranges to identify a host address of the first registry to send the second verification request.

15. A computer-implemented method of network verification comprising:
- obtaining, from a device situated in a terminating call network, call data received in a call signal and a SIP identity header associated with the call signal, and storing in a registry coupled to the device as a terminating call record;
- sending, to a remote registry over the out-of-band verification network, a second verification request containing the terminating call record, and receiving a second verification response;
- receiving, from the remote registry over the out-of-band verification network, a first verification request that contains an originating call record that includes a SIP identity header associated with the call signal, and sending a first verification response; and
- sending the SIP identity header contained in the first verification request to the device.

16. The method of claim 15, wherein call data contained in a call signal includes a calling A-number, a called B-number, and a call event mark.

17. The method of claim 15, further comprising obtaining, from the first device, number portability information and roaming information associated with the obtained call data.

18. The method of claim 15, wherein the first verification request and second verification request include a calling A-number, a called B-number, a call event mark, number portability information, and roaming information associated with a call signal.

19. The method of claim 15, wherein the first verification response and second verification response include a calling A-number, a called B-number, a call event mark, number portability information, and roaming information associated with a call signal.

20. The method of claim 15, wherein the obtained call data and SIP identity header is obtained from the device by a standard networking protocol, including RADIUS, Diameter, HTTP, or SIGTRAN.

21. The method of claim 16, wherein the registry is further configured to match a called-B number in the terminating call record to corresponding E164 ranges so as to identify a host address of the remote registry to send the second verification request.

* * * * *